United States Patent
Saita et al.

(10) Patent No.: US 6,899,916 B2
(45) Date of Patent: May 31, 2005

(54) COMPOSITE SUBSTRATE, EL PANEL USING THE SAME, AND MAKING METHOD

(75) Inventors: Yoshio Saita, Tokyo (JP); Jun Hagiwara, Tokyo (JP); Yukihiko Shirakawa, Tokyo (JP); Masato Susukida, Tokyo (JP)

(73) Assignee: The Westaim Corporation, Fort Saskatchewan (CA)

( * ) Notice: Subject to any disclaimer, the term of this patent is extended or adjusted under 35 U.S.C. 154(b) by 0 days.

(21) Appl. No.: 10/282,136

(22) Filed: Oct. 29, 2002

(65) Prior Publication Data

US 2003/0090199 A1 May 15, 2003

(30) Foreign Application Priority Data

Oct. 29, 2001 (JP) ........................................ 2001-331588
May 24, 2002 (JP) ........................................ 2002-151043

(51) Int. Cl.[7] .......................... H05B 33/22; B32B 18/00; B05D 5/12
(52) U.S. Cl. .......................... 427/66; 428/690; 428/917; 428/411.1; 428/701; 428/702; 313/506; 313/509
(58) Field of Search .............................. 428/411.1, 690, 428/701, 702, 917; 427/66; 313/506, 509

(56) References Cited

U.S. PATENT DOCUMENTS 5,432,015 A * 7/1995 Wu et al. .................... 428/690

6,577,059 B2 * 6/2003 Shirakawa et al. .......... 313/506
2002/0041147 A1 * 4/2002 Shirakawa et al. .......... 313/498
2002/0127429 A1 * 9/2002 Shirakawa et al. .......... 428/690

FOREIGN PATENT DOCUMENTS

| JP | 01-255194 | 10/1989 |
|---|---|---|
| JP | 7-50197 | 2/1995 |
| JP | 7-44072 | 5/1995 |
| KR | 2001-0110473 | 12/2001 |

OTHER PUBLICATIONS

X. Wu, "Multicolor Thin–Film Ceramic Hybrid El Displays", International Display Workshop (IDW), 1997, pp. 593–596.

S. Tanaka, Display, pp. 1–10, "Recent Development of Inorganic and Organic El Display", Apr. 1998 (with partial English translation).

* cited by examiner

Primary Examiner—Dawn Garrett
(74) Attorney, Agent, or Firm—Oblon, Spivak, McClelland, Maier & Neustadt, P.C.

(57) ABSTRACT

A composite substrate includes a substrate, an electrode formed on the substrate, a first dielectric layer of thick film dielectric formed on the electrode, a second dielectric layer formed on the first dielectric layer by a solution coating-and-firing technique, and a buffer layer formed below and/or within the first dielectric layer. The composite substrate keeps the thick-film dielectric layer fully insulating and enables functional thin films formed thereon such as a light emitting layer to perform stable operation, especially stable light emission. An EL panel using the same and a method for preparing the same are also provided.

5 Claims, 11 Drawing Sheets

COMPOSITE SUBSTRATE, EL PANEL USING THE SAME, AND MAKING METHOD

BACKGROUND OF THE INVENTION

1. Technical Field

This invention relates to a composite substrate for use in light emitting display devices and planar light sources and a method for preparing the same, and especially to an EL panel of AC drive type EL device using a high-permittivity ceramic layer as the insulating layer.

2. Background Art

EL devices are on commercial use as backlight in liquid crystal displays (LCD) and watches.

The EL devices utilize the phenomenon that a material emits light upon application of an electric field, known as electroluminescent phenomenon.

The EL devices include dispersion type EL devices of the structure that a dispersion of powder luminescent material in organic material or enamel is sandwiched between electrode layers, and thin-film type EL devices in which a light emitting thin film sandwiched between two electrode layers and two insulating thin films is formed on an electrically insulating substrate. For each type, the drive modes include DC voltage drive mode and AC voltage drive mode. The dispersion type EL devices are known from the past and have the advantage of easy manufacture, but their use is limited because of a low luminance and a short lifetime. On the other hand, the thin-film type EL devices are currently on widespread use on account of a high luminance and a long lifetime.

FIG. 19 shows the structure of a dual insulated thin-film EL device as a typical prior art thin-film type EL device. This thin-film EL device includes a transparent substrate 21 of a sheet glass customarily used in liquid crystal displays or plasma display panels (PDP), a transparent electrode layer 22 formed of ITO or the like in a predetermined stripe pattern to a thickness of about 0.2 to 1 $\mu$m, a thin-film transparent first insulator layer 23, a light emitting layer 24 having a thickness of about 0.2 to 1 $\mu$m, and a thin-film second insulator layer 25, and a metal electrode layer 26 of Al thin film or the like which is patterned into stripes extending perpendicular to the transparent electrode layer 22. A voltage from a power supply 30 is selectively applied to a specific light-emitting material selected in the matrix formed by the transparent electrode layer 22 and the metal electrode layer 26, whereby the light-emitting material in the selected pixel emits light which comes out from the substrate 21 side. The thin-film insulator layers 23, 25 have a function of restricting the current flow through the light emitting layer 24 in order to restrain breakdown of the thin-film EL device and act so as to provide stable light-emitting characteristics. Thus thin-film EL devices of this structure are on widespread commercial use.

Nevertheless, for these thin-film EL devices, a structural problem remains still unsolved. Specifically, since the insulator layer is formed of a thin film, it is difficult to manufacture displays having large surface areas while completely eliminating steps at the edge of a transparent electrode pattern and avoiding defects in the thin-film insulator introduced by debris or the like in the manufacturing process. This leaves a problem that the light emitting layer fails on account of a local drop of dielectric strength. Such defectives impose a fatal problem to display devices and create a substantial barrier against the widespread commercial application of thin-film EL devices as large-area displays, in contrast to liquid crystal displays and plasma displays.

To solve the problem of defects in the thin-film insulator, JP-B 7-44072 discloses an EL device which uses an electrically insulating ceramic substrate as the substrate and a thick-film dielectric material instead of the thin-film insulator underlying the light emitting layer. Since the EL device of the above patent is constructed such that light emitted by the light emitting layer is extracted from the upper side remote from the substrate as opposed to prior art thin-film EL devices, a transparent electrode layer is formed on the upper side.

Further, in this EL device, the thick-film dielectric layer is formed to a thickness of several tens to several hundreds of microns, which is several hundred to several thousand times of the thickness of the thin-film insulator layer. This minimizes the potential of breakdown during initial operation which is otherwise caused by steps of electrodes and pinholes formed by debris in the manufacturing process. Meanwhile, the use of such a thick-film dielectric layer entails a problem that the effective voltage applied across the light emitting layer drops. For example, the above-referred JP-B 7-44072 overcomes this problem by using a complex perovskite high-permittivity material in the dielectric layer.

However, the light emitting layer formed on the thick-film dielectric layer has a thickness of several hundreds of nanometers which is merely about $\frac{1}{100}$ of that of the thick-film dielectric layer. This requires that the thick-film dielectric layer on the surface be smooth at a level below the thickness of the light emitting layer although a conventional thick-film procedure is difficult to form a dielectric layer having a fully smooth surface.

Specifically, the thick-film dielectric layer is essentially constructed of a ceramic material obtained using a powder raw material. Then intense sintering generally brings a volume contraction of about 30 to 40%. Unfortunately, although customary ceramics consolidate through three-dimensional volume contraction upon sintering, thick-film ceramics formed on substrates cannot contract in the in-plane directions of the substrate under restraint by the substrate, and is allowed for only one-dimensional volume contraction in the thickness direction. For this reason, sintering of the thick-film dielectric layer proceeds insufficiently, resulting in an essentially porous body. Moreover, since the surface roughness of the thick film is not reduced below the crystal grain size of the polycrystalline sintered body, its surface has asperities greater than the submicron size.

On such an uneven surface of the dielectric layer, a light emitting layer cannot be uniformly formed by vapor phase deposition techniques such as evaporation or sputtering. It is then impossible to effectively apply an electric field across an uneven light emitting layer, resulting in a reduction of effective luminous area. On account of local unevenness of film thickness, the light emitting layer undergoes partial breakdown, resulting in a lowering of emission luminance. Moreover, since the film thickness has large local variations, the strength of the electric field applied across the light emitting layer has large local variations as well, failing to provide a definite emission voltage threshold.

To solve these and other problems, for example, JP-A 7-50197 discloses a procedure of improving surface smoothness by stacking on a thick-film dielectric of lead niobate a high-permittivity layer of lead titanate zirconate or the like to be formed by the sol-gel technique. As shown in FIG. 20, an electrode 12 is formed on a substrate 11, a thick-film dielectric layer 13 is formed thereon, and a smoothing layer 14 of lead titanate zirconate or the like is then formed by the sol-gel technique, thereby improving surface smoothness.

However, when a smoothing layer is formed on the surface of a thick-film dielectric layer having a thickness of about several tens to several hundreds of microns which is porous, microcracks generate in the smoothing layer. The cracked areas become less insulating, making it difficult to ensure stable operation over a long term.

Moreover, the thick-film dielectric layer can locally include asperities of a size larger than the above-described surface roughness. Once such large asperities are formed, it becomes difficult to form a completely smooth layer thereon by the sol-gel technique.

When a thick film having local asperities is leveled out by forming PZT thereon by the sol-gel technique and firing, the surface roughness following the smoothening has a substantial variation. The variation of surface roughness is eventually reflected by a luminous variation at low luminance during EL light emission and in serious cases, can cause the smoothing layer to generate cracks. Cracks become the cause of abnormal light emission known as bright spots. In either case, the variation of surface roughness causes a variation of light emission.

SUMMARY OF THE INVENTION

An object of the invention is to provide a composite substrate having a thick-film dielectric layer and functional thin films formed thereon and including a light emitting layer, which keeps the thick-film dielectric layer fully insulating and enables the functional thin films to perform stable operation, especially stable light emission; a EL panel comprising the same and a method for preparing the same.

Another object of the invention is to provide a method for preparing an EL device, in which a thick-film ceramic dielectric layer is endowed with surface smoothness by a sol-gel dielectric layer, in a consistent manner such that the EL device may produce EL light emission without variation during operation; and the EL device prepared thereby.

In a first aspect, the invention provides a composite substrate comprising at least a substrate, an electrode formed on the substrate, a first dielectric layer of thick film dielectric formed on the electrode, a second dielectric layer formed on the first dielectric layer by a solution coating-and-firing technique, and a buffer layer(s) formed below and/or within the first dielectric layer.

In a preferred embodiment, the buffer layer is a dielectric layer formed by a solution coating-and-firing technique. In a further preferred embodiment, the buffer layer includes a plurality of layers separated by the first dielectric layer, and the total number of buffer layers is 2 to 5.

In a second aspect, the invention provides an EL panel comprising the composite substrate defined above, a light emitting layer and another electrode layer on the second dielectric layer in the composite substrate.

In a third aspect, the invention provides a method for manufacturing an EL device comprising an electrically insulating substrate, a patterned first electrode layer on the substrate, a dielectric layer covering at least a part of the first electrode layer, a light emitting layer and a second electrode layer successively formed on the dielectric layer, the dielectric layer having a multilayer structure including a first dielectric layer in the form of a thick film and a second dielectric layer formed by a solution coating-and-firing technique. The method involves the step of forming one or more first dielectric layers, which step further includes forming a buffer layer(s) below the first dielectric layer and/or between the first dielectric layers. The buffer layer is preferably made of a material which forms a solid solution with the first dielectric layer material and becomes integrated therewith upon firing, and more preferably tantalum oxide or barium titanate.

An EL device manufactured by the above method is also provided, in which preferably at least portions of the buffer layer and the first dielectric layer form a solid solution and become integrated together.

Investigating the cause of introducing asperities in a thick-film dielectric layer, we have found that the structure in which a high permittivity thick-film dielectric layer is formed on an internal electrode by firing a PMN-PT or similar powder entails a difference in sintered density because the sintering behavior of the thick-film dielectric layer differs between the regions above the internal electrode pattern and the space regions on the ceramic substrate where the internal electrode is absent, with an increased propensity to induce a variation in sintered density of the thick-film dielectric layer particularly when the layer is formed on a metal electrode. As a result of this phenomenon, a variation in sintered density is most likely to occur between the thick film regions above or in proximity to the boundary (or electrode edge) between the electrode pattern and the non-electrode pattern or space and the other thick film regions above the electrode. Accordingly, substantial asperities are introduced on the surface of the thick-film dielectric layer at the end of firing.

When such a surface is smoothed by coating the surface with PZT by the sol-gel technique and firing, the PZT layer resulting from this smoothing operation has a large variation in surface roughness. This variation of surface roughness is reflected by a luminous variation at low luminance during EL light emission. If the variation is significant, cracks generate in the PZT, causing abnormal light emission known as bright spots. In either case, the variation of surface roughness causes a variation of light emission.

When a buffer layer, for example, in the form of a thin film is interleaved between the internal electrode and the porous sintered layer of PMN-PT or the like, as the means for preventing such asperities from generating, a high-permittivity ceramic insulating layer can be formed to a uniform density by firing a powder of PMN-PT or the like, whereby surface asperities can be minimized. As a result, the thickness variation of PZT which has been fired for smoothing is minimized, thereby preventing any variation of EL light emission. Generation of cracks can also be restrained.

DESCRIPTION OF THE PREFERRED EMBODIMENTS

Figure 1:
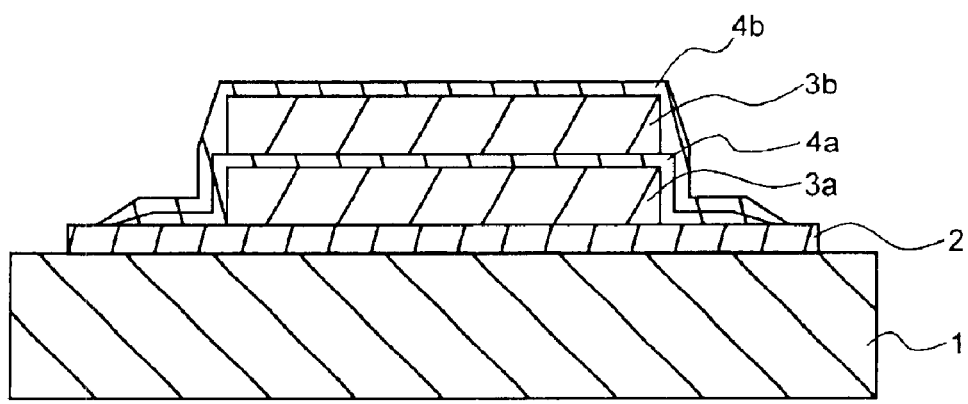
FIG. 1 is a schematic sectional view of a composite substrate according to one embodiment of the invention.

The composite substrate of the invention includes at least a substrate, an electrode formed on the substrate, a thick-film dielectric layer formed on the electrode, and a dielectric layer formed on the thick-film dielectric layers by a solution coating-and-firing technique, wherein the thick-film dielectric layer and the dielectric layer formed by the solution coating-and-firing technique are alternately formed in plurality.

The provision of a dense dielectric layer formed by the solution coating-and-firing technique as a buffer layer below the thick-film dielectric layer or between the thick-film dielectric layers ensures the insulating effects of the thick-film dielectric layers and stable operation or light emission over a long period of time when functional thin films such as a light emitting layer are formed thereon. That is, the voltage applied between the internal electrode and a thin film such as the light emitting layer is stabilized and as a result, the device becomes stable and is improved in reliability.

When a dielectric material solution is coated onto a thick-film dielectric layer, the dielectric material solution penetrates in an upper portion of the underlying thick-film dielectric layer to a certain depth due to a capillary phenomenon or the like, and is packed among crystal grains in the penetrated region of the thick-film dielectric layer. By subsequent firing, the organic component in the dielectric material solution is burnt and gasified to invite a volume contraction and at the same time, some spaces among crystal grains of the thick-film dielectric layer are filled with the dielectric material formed by the solution coating-and-firing technique whereby a high density region is formed in an upper portion of the thick-film dielectric layer to a certain depth. Accordingly, while forming a dense dielectric layer on the thick-film dielectric layer by the solution coating-and-firing technique, the present invention concomitantly exerts the effect of densifying the upper region of the underlying thick-film dielectric layer due to the above-described phenomenon.

More particularly, when a dielectric layer is formed on a thick-film dielectric layer by the solution coating-and-firing technique, the dielectric layer can be formed to such an extent as to fill among crystal grains of the thick-film dielectric layer, by adjusting the viscosity or coating weight of the dielectric material solution. Although a definite layer structure is not formed in this case, the benefits of the invention are obtainable by forming a dielectric layer on a thick-film dielectric layer by the solution coating-and-firing technique for densifying the thick-film dielectric layer. Accordingly, the "dielectric layer formed by the solution coating-and-firing technique" as used herein includes a dielectric layer which becomes integrated with the thick-film dielectric layer in the above-described way.

The composite multilayer consisting of thick-film dielectric layers and dielectric layers formed by the solution coating-and-firing technique desirably becomes more insulating and more stable as the number of layers in the composite multilayer increases. However, an increased number of dielectric layers formed by the solution coating-and-firing technique makes the process complicated, increasing the product cost. For this reason, the preferred number of layers is 2 to 5, and especially 2 to 3.

The composite substrate of the invention may take a structure as shown in FIG. 1, for example. Illustrated in FIG. 1 is a multilayer structure including on an electrically insulating substrate 1, a lower electrode layer 2 formed to a predetermined pattern, thick-film dielectric layers 3a and 3b formed thereon, and dielectric layers 4a and 4b formed by the solution coating-and-firing technique. Though not shown in the figure, a dielectric layer formed by the solution coating-and-firing technique may further be disposed below the thick-film dielectric layer 3a. This dielectric layer formed below the thick-film dielectric layer 3a also has the function of a buffer layer on the electrode to be described later.

The substrate used herein is not critical as long as it is electrically insulating, does not contaminate the lower electrode layer and dielectric layers to be formed thereon, and maintains a predetermined temperature strength.

Illustrative materials include ceramic substrates of alumina ($Al_2O_3$), quartz glass ($SiO_2$), magnesia (MgO), forsterite ($2MgO.SiO_2$), steatite ($MgO.SiO_2$), mullite ($3Al_2O_3.2SiO_2$), beryllia (BeO), zirconia ($ZrO_2$), aluminum nitride (AlN), silicon nitride (SiN), and silicon carbide (SiC) as well as crystallized glass, heat resistant glass or the like. Enamel-coated metal substrates can also be used.

The lower electrode layer is formed, in the case of a passive matrix type, to a stripe pattern of plural lines. The line width is the width of one pixel. Since the space between lines becomes a non-luminous region, it is preferred to keep the space between lines as small as possible. Illustratively, a line width of about 200 to 500 $\mu$m and a space of about 20 to 50 $\mu$m, for example, are necessary although these values depend on the desired resolution of the display.

The material of the lower electrode layer is preferably one which has a high electric conductivity, is not damaged upon formation of the dielectric layer, and is low reactive with the dielectric layer and light emitting layer. Preferred lower electrode layer materials are noble metals such as Au, Pt, Pd, Ir and Ag, noble metal alloys such as Au—Pd, Au—Pt, Ag—Pd and Ag—Pt, and electrode materials based on noble metals and having base metal elements added such as Ag—Pd—Cu because they readily exhibits oxidation resistance in an oxidizing atmosphere during firing of the dielectric layer. Also useful are conductive oxide materials such as ITO, $SnO_2$ (NESA film) and ZnO—Al. It is also possible to use base metals such as Ni and Cu, as long as the oxygen partial pressure during firing of the dielectric layer is set in the range where the base metals are not oxidized. The lower electrode layer may be formed by any well-known technique such as sputtering, evaporation or plating.

Also useful are electrode layers formed of materials known as liquid gold, gold resinate or bright gold. These materials known as liquid gold or aqueous gold are solutions of organometallic compounds of gold in terpene solvents at a level of about 4 to 25%, which are brown viscous liquids. Using liquid gold, a dense gold film as thin as 50 to 500 nm is obtainable. Since liquid gold is soluble in terpene to form a solution whose viscosity can be adjusted as desired, an electrode pattern can be formed by any coating or printing technique such as spraying or screen printing. After coating, the liquid gold is dried and annealed at about 450 to 850° C. to form a wiring pattern of gold.

The thick-film dielectric layer should have a high permittivity and high dielectric strength and is further required to be low-temperature sinterable, with the heat resistance of the substrate being taken into account.

The thick-film dielectric layer as used herein means a ceramic layer which is formed by firing a powder insulating material according to the so-called thick-film technique. The thick-film dielectric layer may be formed, for example, by mixing a powder insulating material with a binder and a solvent to form an insulating paste, and printing the insulating paste onto the substrate having the lower electrode layer borne thereon, followed by firing. Alternatively, it may be formed by casting the insulating paste to form green sheets, and placing the green sheets one on top of another.

Binder removal prior to the firing may be effected under conventional conditions.

The atmosphere during firing may be determined as appropriate depending on the type of lower electrode material. Where firing is effected in an oxidizing atmosphere, conventional firing in air is acceptable.

The holding temperature during firing may be determined as appropriate depending on the type of the insulator layer although it is usually in the range of about 700 to 1200° C., preferably up to 1,000° C. The holding time during firing is preferably 0.05 to 5 hours, especially 0.1 to 3 hours.

If desired, annealing treatment is carried out.

The thickness of the thick-film dielectric layer must be large enough to minimize steps of the electrode and to avoid formation of pin holes by dust and debris during the manufacturing process. Specifically, the thick-film dielectric layers in the entire multilayer structure have a total thickness of at least about 10 $\mu$m, preferably about 15 to 20 $\mu$m.

A variety of materials are contemplated for the thick-film dielectric layer. When the limit by the heat resistance of the substrate material is taken into account, the material must be a high-permittivity ceramic composition capable of low-temperature sintering.

Preferred materials used herein are, for example, perovskite structure dielectric and ferroelectric materials such as $BaTiO_3$, $(Ba_xCa_{1-x})TiO_3$, $(Ba_xSr_{1-x})TiO_3$, $PbTiO_3$ and $Pb(Zr_xTi_{1-x})O_3$, complex perovskite relaxation type ferroelectric materials as typified by $Pb(Mg_{1/3}Ni_{2/3})O_3$, bismuth layer compounds as typified by $Bi_4Ti_3O_{12}$ and $SrBi_2Ta_2O_9$, and tungsten bronze type ferroelectric materials as typified by $(S_xBa_{1-x})Nb_2O_6$ and $PbNb_2O_6$ because all these materials have a high permittivity and are easy to fire.

Also, dielectric materials containing lead in their composition are preferred in that they are readily sinterable at low temperatures because the melting point of lead oxide is as low as 888° C. and a liquid phase is formed at low temperatures of about 700 to 800° C. between lead oxide and another oxide base material such as $SiO_2$, CuO, $Bi_2O_3$ or $Fe_2O_3$, and because a high permittivity is readily available. Preferred materials used herein are, for example, perovskite structure dielectric materials such as $Pb(Zr_xTi_{1-x})O_3$, complex perovskite relaxation type ferroelectric materials as typified by $Pb(Mg_{1/3}Ni_{2/3})O_3$, and tungsten bronze type ferroelectric materials as typified by $PbNb_2O_6$. When these materials are used, a dielectric layer having a relative permittivity of 1,000 to 10,000 can be readily formed by firing at a temperature of 800 to 900° C. which is the upper limit heat resistant temperature of conventional ceramic substrates such as alumina ceramics.

When a dielectric layer is formed by the solution coating-and-firing technique, a precursor solution is used in the solution coating-and-firing technique. The precursor solution contains an organometallic compound or alkoxide of a metal element of which the dielectric layer is constructed, a composite of a metal source element with an organic matter in the solution, and a volatile solvent.

The solution coating-and-firing technique as used herein encompasses techniques of applying a precursor solution to a substrate, followed by firing to form a dielectric layer, such as sol-gel technique and MOD technique.

The sol-gel technique is generally a technique of adding a predetermined amount of water to a metal alkoxide in a solvent, effecting hydrolysis and polycondensation to form a sol precursor solution having M-O-M bonds, applying the precursor solution to a substrate, and firing to form a film. The MOD (metallo-organic decomposition) technique is a technique of dissolving a metal salt of carboxylic acid having M-O bonds in an organic solvent to form a precursor solution, applying the precursor solution to a substrate, and firing to form a film. The precursor solution designates a solution containing intermediate compounds formed by dissolving starting compounds in a solvent, in the sol-gel, MOD and other film forming techniques.

The sol-gel and MOD techniques are not completely separate techniques, but are generally used in combination. For example, when a film of PZT is formed, it is a common practice to prepare a solution using lead acetate as the Pb source and alkoxides as the Ti and Zr sources. Sometimes, both the sol-gel and MOD techniques are generally referred to as sol-gel technique. Since a film is formed in either case by applying a precursor solution to a substrate followed by firing, the relevant technique is referred herein as the "solution coating-and-firing technique." A solution obtained by mixing dielectric particles of submicron size with a dielectric precursor solution is encompassed within the concept of the dielectric precursor solution as used in the present invention, and a procedure of applying that solution to a substrate followed by firing is also encompassed within the concept of the solution coating-and-firing technique as used in the present invention.

The solution coating-and-firing technique in which elements constituting the dielectric are intimately mixed, independent of whether it is the sol-gel or MOD technique, is characterized by a possibility to synthesize dense dielectrics at very low temperatures, as compared with the techniques essentially relying on ceramic powder sintering as in the formation of dielectric by the thick-film technique.

The solution coating-and-firing technique is used for the following major purposes. The dielectric layer formed by this technique is characterized in that because it is formed by way of the steps of applying a precursor solution and firing, it is formed thick in recesses of the substrate and thin on protrusions of the substrate. Additionally, the dielectric material enters micropores in the thick-film dielectric layer and penetrates to the interior thereof so that the thick-film dielectric layer as a whole is densified.

Accordingly, the dielectric layer formed by the solution coating-and-firing technique should desirably have a thickness of preferably at least 0.5 $\mu$m, more preferably at least 1 $\mu$m, in order to fully smooth out asperities on the thick film surface. When the dielectric layer is formed below the thick-film dielectric layer or within the thick-film dielectric layer, a thickness of about 0.01 to 1 $\mu$m is preferred. It is noted that in an extreme case, the lower limit of layer thickness is a thickness wherein only the trace is recognizable at an order sufficient to fill in recesses on an irregular surface, because the coating solution forms a layer which is thick in recesses of the substrate and thin on protrusions of the substrate, and enters micropores in the thick-film dielectric layer and penetrates to the interior thereof, as described above. Therefore, the above-described lower limit is merely one measure. In this context, the dielectric layer formed by the solution coating-and-firing technique may have such a thickness that the dielectric layer can be acknowledged or includes some regions having such a thickness that portions of the dielectric layer can be acknowledged.

The film formation by the solution coating-and-firing technique is carried out by applying a precursor solution to a substrate by such a technique as spin coating, dip coating or spray coating, for forming a precursor layer on the substrate, then firing the precursor layer for removing the organic component in the precursor and for causing the metal element to bond with oxygen to form a ultrafine oxide layer which oxide is further fired to form a dielectric layer.

The dielectric layer formed by the solution coating-and-firing technique should desirably have a high permittivity. Useful high-permittivity materials include perovskite structure dielectric and ferroelectric materials such as $BaTiO_3$, $(Ba_xCa_{1-x})TiO_3$, $(Ba_xSr_{1-x})TiO_3$, $PbTiO_3$ and $Pb(Zr_xTi_{1-x})O_3$, complex perovskite relaxation type ferroelectric materials as typified by $Pb(Mg_{1/3}Ni_{2/3})O_3$, bismuth layer compounds as typified by $Bi_4Ti_3O_{12}$ and $SrBi_2Ta_2O_9$, and tungsten bronze type ferroelectric materials as typified by $(Sr_xBa_{1-x})Nb_2O_6$ and $PbNb_2O_6$. Of these, perovskite structure ferroelectric materials such as $BaTiO_3$ and PZT are preferred because they have a high permittivity and are easy to fire at relatively low temperatures.

Figure 2:
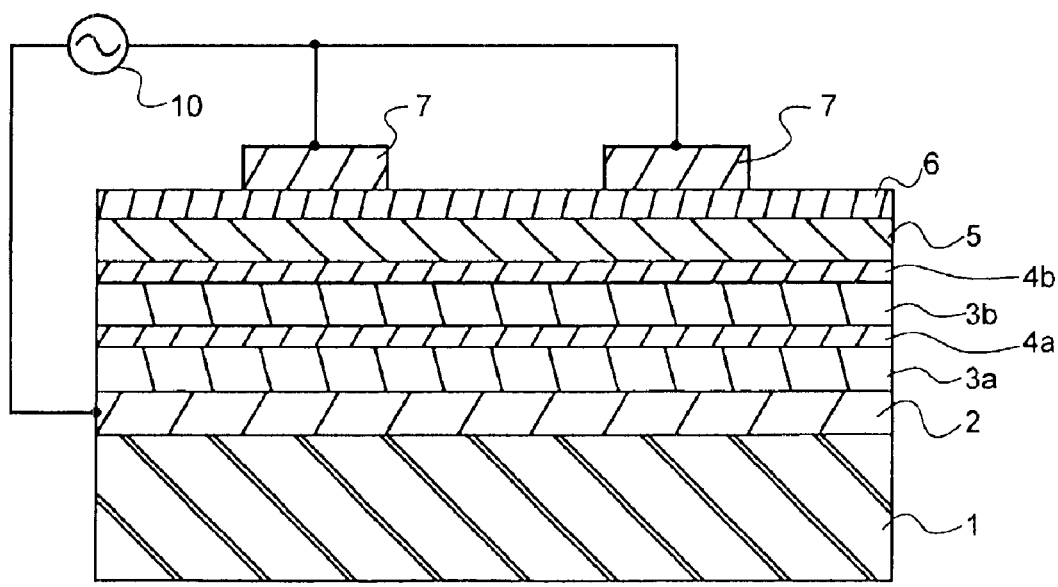
FIG. 2 is a schematic sectional view of an EL panel according to one embodiment of the invention.

A structure as shown in FIG. 2, for example, may be employed when an EL panel is constructed using the composite substrate of the invention. The EL panel includes a lower electrode layer 2 formed on an electrically insulating substrate 1 to a predetermined pattern, a multilayer structure thereon including thick-film dielectric layers 3a and 3b and dielectric layers 4a and 4b formed by the solution coating-and-firing technique, and a light emitting layer 5, a thin-film insulator layer 6 and a transparent electrode layer 7 stacked further thereon. It is noted that the thin-film insulator layer 6 may additionally formed between the dielectric layer formed by the solution coating-and-firing technique and the light emitting layer or omitted. The lower electrode layer 2 and the upper transparent electrode layer 7 are formed as stripes extending in orthogonal directions. By selecting any stripe of lower electrode layer 2 and any stripe of upper electrode layer 7, and applying a voltage across the light emitting layer at the intersection between the selected electrode stripes from an AC or pulse power supply 10, light emission can be derived from a selected pixel.

The material of which the light emitting layer is made is not critical, and well-known materials such as Mn-doped ZnS are useful. Of these, SrS:Ce and analogues having excellent characteristics are especially preferred. The thickness of the light emitting layer is not critical. However, too thick a layer requires an increased drive voltage whereas too thin a layer results in a low emission efficiency. Illustratively, the light emitting layer is preferably about 100 to 2,000 nm thick, although the thickness varies depending on the identity of the emissive material.

In forming the light emitting layer, any vapor phase deposition technique may be used. The preferred vapor phase deposition techniques include physical vapor deposition such as sputtering or evaporation, and chemical vapor deposition (CVD). Also, when a light emitting layer of SrS:Ce is formed in a $H_2S$ atmosphere at a substrate temperature of 500 to 600° C. by an electron beam evaporation technique, the resulting light emitting layer can be of high purity.

Following the formation of the light emitting layer, annealing is preferably carried out. Annealing may be carried out after an electrode layer, a dielectric layer, and a light emitting layer are sequentially deposited from the substrate side. Alternatively, annealing may be carried out after an electrode layer, a dielectric layer, a light emitting layer and an insulator layer are sequentially deposited from the substrate side or after an electrode layer is further formed thereon. The temperature of annealing is preferably at least 300° C., more preferably at least 400° C., and below the firing temperature of the dielectric layer though it depends on the identity of the light emitting layer. The treating time is preferably 10 to 600 minutes. The atmosphere during annealing may be selected from air, $N_2$, He and Ar, depending on the composition and forming conditions of the light emitting layer.

The main purposes of the thin-film insulator layer are to adjust the electron state at the interface between the light emitting layer and the dielectric layer for rendering stable and efficient the injection of electrons into the light emitting layer and to establish the electron state symmetrically on the opposite surfaces of the light emitting layer for improving the positive-negative symmetry of luminescent characteristics upon AC driving. Since the function of maintaining dielectric strength as the typical role of the dielectric layer need not be considered, the thickness may be small.

The insulator layer preferably has a resistivity of at least $10^8$ $\Omega\cdot$cm, especially about $10^{10}$ to $10^{18}$ $\Omega\cdot$cm. A material having a relatively high relative permittivity as well is preferred. The relative permittivity is preferably at least 3. The materials of which the insulator layer is made include, for example, silicon oxide ($SiO_2$), silicon nitride (SiN), tantalum oxide ($Ta_2O_5$), yttrium oxide ($Y_2O_3$), zirconia ($ZrO_2$), silicon oxynitride (SiON), alumina ($Al_2O_3$), etc. In forming the insulator layer, sputtering, evaporation, and CVD techniques may be used. The insulator layer preferably has a thickness of about 10 to 1,000 nm, especially about 20 to 200 nm.

The transparent electrode layer is formed of electrically conductive oxide materials such as ITO, $SnO_2$ (NESA film) and ZnO—Al having a thickness of 0.2 to 1 $\mu$m. In forming the transparent electrode layer, well-known techniques such as sputtering and evaporation may be used.

Although the above-illustrated EL device has only one light emitting layer, the EL device of the invention is not limited to the illustrated construction. For example, a plurality of light emitting layers of different type may be stacked in the thickness direction, or a plurality of light emitting layer sections (pixels) of different type are combined on a common surface in a planar arrangement.

The EL device manufacturing method of the invention is to manufacture an EL device comprising an electrically insulating substrate, a patterned first electrode layer on the substrate, a dielectric layer covering at least a part of the first electrode layer, at least a light emitting layer and a second electrode layer successively formed on the dielectric layer, the dielectric layer having a multilayer structure including first dielectric layers in the form of a thick film and second dielectric layers formed by a solution coating-and-firing technique. The method involves the steps of placing a buffer layer at least on the first electrode layer between the electrode layer-bearing substrate and the first dielectric layer, and thereafter, firing the first dielectric layer thereon.

By placing a buffer layer at least on the electrode layer, and forming a thick-film dielectric layer thereon and firing, it becomes possible to prevent the thick-film dielectric layer formed on the buffer layer from becoming uneven in sintered density and to prevent the surface from becoming irregular.

The buffer layer is formed for the purpose of correcting the unevenness of sintered density of the thick-film dielectric layer formed thereon. Accordingly, the buffer layer is preferably made of a similar oxide material to the dielectric layer, and more preferably a material which forms a solid solution and becomes integrated with the material of which the thick-film dielectric layer is made.

Also, since the buffer layer is to correct the difference in sintered density between the thick-film dielectric layer on the patterned electrode and the thick-film dielectric layer on the substrate other than the electrode-forming region, the buffer layer should be interleaved between the electrode and the thick-film dielectric layer at least in the display region. It is noted that the buffer layer may be formed over the entire area so as to entirely cover the electrode layer and the spaces where the electrode layer is not formed. When the final structure that the buffer layer is integrated with the thick-film dielectric layer at the end of thick film firing is taken into account, it is unnecessary that the buffer layer be formed so as to extend beyond the region where the thick-film dielectric layer is to be formed. However, to ascertain traces of the buffer layer, it is acceptable that the buffer layer is formed on a region where it is not absorbed later in the thick-film dielectric layer, whereupon the residual portion of the buffer layer is ascertainable.

The buffer layer has any desired thickness, but sufficient to correct the unevenness of sintered density of the thick-film dielectric layer. From the aspect of the buffer effect between the electrode and the thick-film dielectric layer, the effect becomes more prominent as the thickness increases. According to the inventors' empirical studies, in the case of oxide thin films formed by sputtering, a noticeable effect is observed at a thickness of 10 nm or more, the effect becomes enhanced as the film thickness increases, and the unevenness of sintered density of the thick-film dielectric layer is completely eliminated at a thickness of 30 nm or more.

Therefore, the necessary film thickness is at least 10 nm, and preferably at least 30 nm. Since the buffer layer, after firing, forms a solid solution and becomes integrated with the material of which the thick-film dielectric layer is made, the buffer layer is substantially absorbed in the thick-film dielectric layer. However, if the buffer layer is too thick, it is partially left without being absorbed in thick-film dielectric layer, so that it can adversely affect device characteristics when it is made of a low-permittivity material. Then, particularly when a low-permittivity material which is relatively easy to deposit is used, the buffer layer thickness is preferably 0.1 $\mu$m or less, and more preferably 0.08 $\mu$m or less.

Preferred materials of which the buffer layer is made are ceramic materials in a broad sense such as metal oxides, especially such materials capable of forming a solid solution with the thick-film dielectric material.

Illustrative examples, though they differ with a particular thick-film dielectric layer used, include tantalum oxide (TaOx, typically $Ta_2O_5$), perovskite type oxides ($ABO_3$ wherein A is at least one element selected from Ba, Sr and Ca, and B is at least one element selected from Ti, Zr and Hf) as typified by barium titanate ($BaTiO_3$), titanium oxide ($TiO_2$), lead titanate ($PbTiO_3$), yttrium oxide ($Y_2O_3$), niobium oxide ($Nb_2O_5$), zirconium oxide ($ZrO_2$) and PZT. Of these, tantalum oxide, barium titanate and titanium oxide are preferred.

The film forming method used herein may be selected from vacuum evaporation, sputtering, CVD and sol-gel techniques.

The buffer layer may also be formed by the solution coating-and-firing technique described above, and the material and thickness preferred in this embodiment are the same as above.

Referring to FIGS. 5 to 8, the EL device manufacturing method of the invention is now described.

Figure 5:
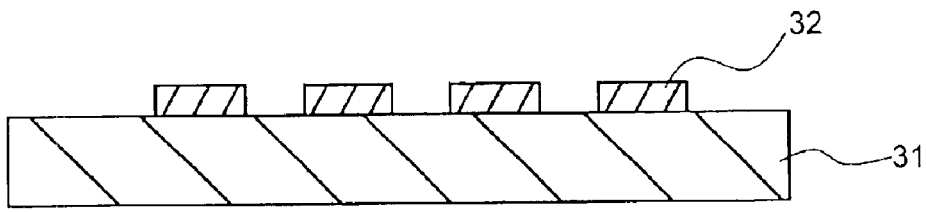
FIGS. 5 to 8 are schematic sectional views showing successive steps for the preparation of an EL device according to the invention.

First, as shown in FIG. 5, a lower electrode 32 is formed on a substrate 31 in a predetermined pattern. The lower electrode 32 may be formed by sputtering, evaporation, coating or otherwise as will be described later. The patterning may be carried out by mask evaporation or otherwise during formation of the electrode layer or by any well-known patterning technique such as photo-etching after formation of the electrode layer.

Figure 6:
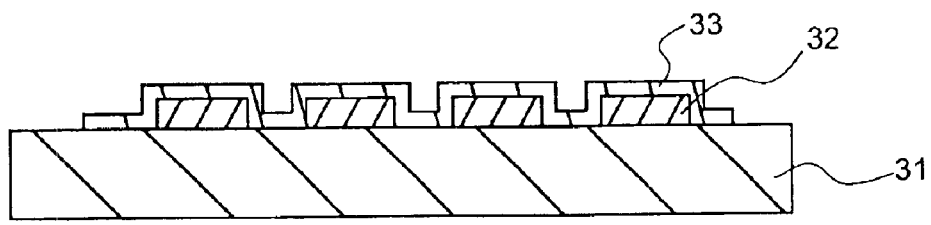

Next, as shown in FIG. 6, a buffer layer 33 is formed on the substrate 31 having the patterned electrode 32. The buffer layer may be formed by sputtering, evaporation or the like as described above.

Figure 7:
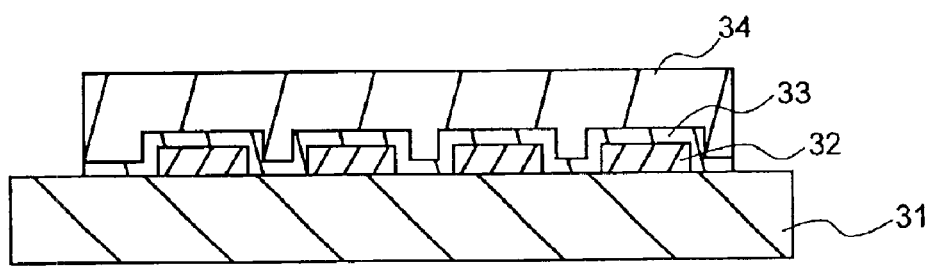
Figure 8:
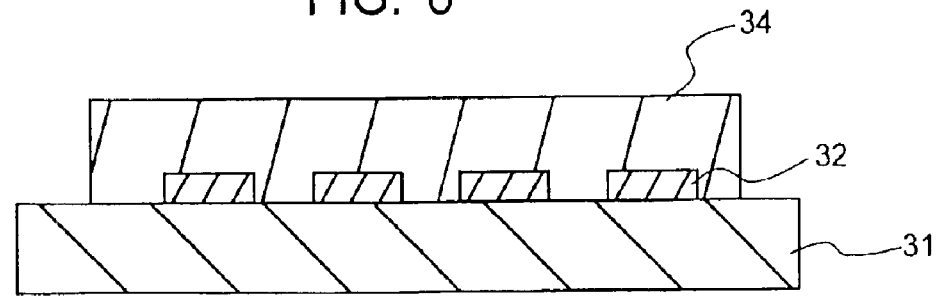

Further, as shown in FIG. 7, a thick-film dielectric layer 34 is formed on the substrate 31 having the buffer layer 33 formed thereon. The thick-film dielectric layer 34 may be formed by any well-known thick-film technique such as screen printing or green sheet placement. The substrate 31 on which the thick-film dielectric layer precursor (or green sheet) has been formed is fired or annealed at a predetermined temperature, resulting in a sintered body 34 in which the buffer layer 33 is absorbed in and integrated with the thick-film dielectric layer 34 as shown in FIG. 8. The resulting sintered body has a uniform sintered density both on the electrode and on the substrate where the electrode is not formed, and is free of noticeable asperities on the surface. At this point, the portion of the buffer layer 33 that has been formed in the marginal region other than the region where the thick-film dielectric layer 34 is to be formed (illustratively, that has been formed to extend beyond the region where the thick-film dielectric layer 34 is to be formed) is left without being absorbed in the thick-film dielectric layer 34.

On the thick-film dielectric layer (or first dielectric layer) 34 thus formed, a second dielectric layer formed by the solution coating technique, a thin-film insulating layer, a light emitting layer, another thin-film insulating layer, and an upper electrode (or transparent electrode) are successively formed, completing an EL device.

Figure 3:
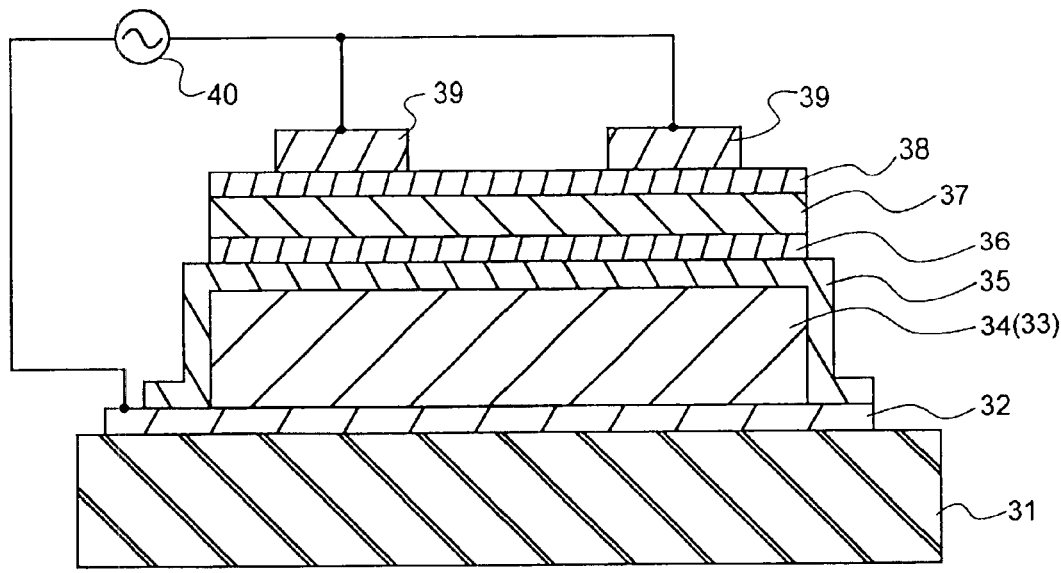
FIG. 3 is a schematic partial sectional view showing one exemplary basic construction of an EL device prepared by the method of the invention.

FIG. 3 shows the basic construction of the EL device obtained by the inventive method. The EL device obtained by the inventive method is constructed such that on an electrically insulating substrate 31, a lower electrode layer 32 is formed in a predetermined pattern, and a thick-film dielectric layer (or the first dielectric layer) 34 having the buffer layer 33 absorbed therein and integrated therewith and a second dielectric layer 35 formed by the solution coating technique are stacked thereon to form a multilayer dielectric layer.

On the multilayer dielectric layer (34, 35), a thin-film insulator layer 36, a light emitting layer 37, another thin-film insulator layer 38, and a transparent electrode 39 are successively deposited. It is noted that the thin-film insulator layers 36, 38 may be omitted. The lower electrode layer 32 and the upper transparent electrode layer 39 are formed in stripes extending in orthogonal directions. By selecting any stripe of lower electrode layer 32 and any stripe of upper transparent electrode layer 39, and applying a voltage across the light emitting layer at the intersection between the selected electrode stripes from an AC or pulse power supply 40, light emission can be derived from a selected pixel.

Figure 4:
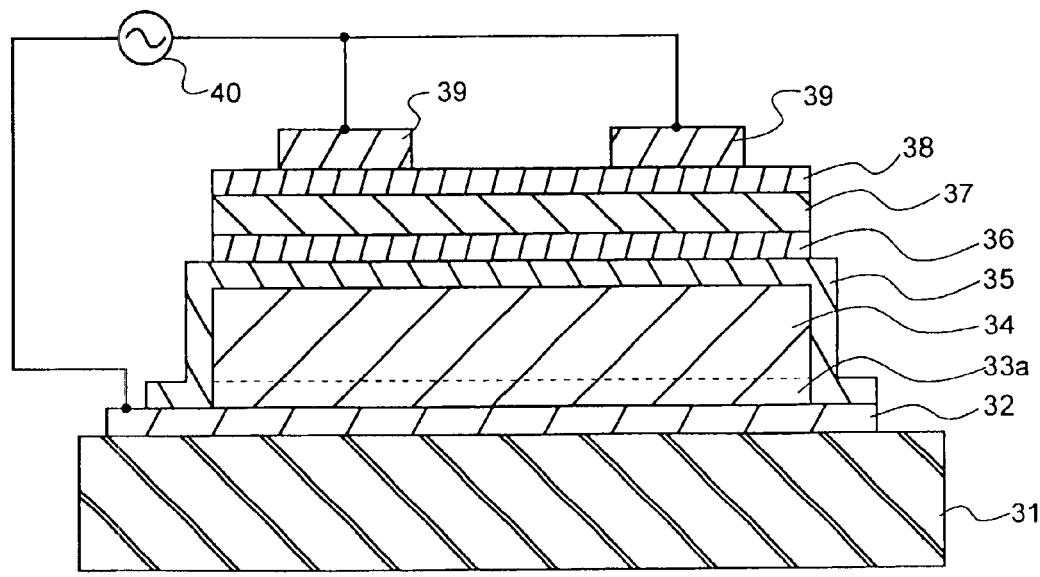
FIG. 4 is a schematic partial sectional view showing another basic construction of an EL device prepared by the method of the invention.

The EL device may be modified, for example, as shown in FIG. 4 wherein a portion of the thick-film dielectric layer 34 that is disposed adjacent to the substrate 31 may have a mix layer 33a by which it can be ascertained that components of the buffer layer have diffused into that portion. It is noted that when the buffer layer is formed by the solution coating-and-firing technique, there is a possibility that at least a portion of the buffer layer be left.

EXAMPLE

Examples of the invention are given below by way of illustration and not by way of limitation.

Example A-1

On a 96% pure alumina substrate, an Au thin film having trace additives added thereto was formed to a thickness of 1 $\mu$m by a sputtering technique. It was annealed at 850° C. for stabilization. The lower electrode layer of Au was patterned in a plurality of stripes having a width of 300 $\mu$m and a space of 30 $\mu$m by a photo-etching technique.

On the substrate having the lower electrode formed thereon, a dielectric ceramic thick film was formed by a screen printing technique. The thick film paste used was thick-film dielectric paste 4210C by ESL. Screen printing and drying steps were repeated such that a film thickness of 5 $\mu$m was obtained at the end of firing.

After the printing and drying steps, the thick film was fired in a belt furnace having a full air feed atmosphere at 850° C. for 20 minutes.

Next, a dielectric layer was formed on the substrate by a solution coating-and-firing technique. In forming the dielectric layer by the solution coating-and-firing technique, a sol-gel solution of PZT (prepared by the following procedure) was furnished and used as a precursor solution in the solution coating-and-firing technique. The steps of applying the precursor solution to the substrate by spin coating and firing the coating at 700° C. for 15 minutes were repeated predetermined times.

For preparing a fundamental sol-gel solution, 8.49 g of lead acetate trihydrate and 4.17 g of 1,3-propane diol were heated and stirred for about 2 hours to form a clear solution. Separately, 3.70 g of a 70 wt % 1-propanol solution of zirconium n-propoxide and 1.58 g of acetyl acetone were heated and stirred in a dry nitrogen atmosphere for 30 minutes, and 3.14 g of a 75 wt % 2-propanol solution of titanium diisopropoxide bisacetyl acetonate and 2.32 g of 1,3-propane diol were added to the solution, which was heated and stirred for 2 hours. These two solutions were mixed at 80° C., heated and stirred in a dry nitrogen atmosphere for 2 hours, obtaining a brown clear solution. The solution was held at 130° C. for several minutes to remove by-products, and heated and stirred for a further 3 hours, yielding a PZT precursor solution.

The PZT precursor solution was adjusted to an appropriate viscosity by diluting it with n-propanol. The thickness per layer of the dielectric layers was determined by adjusting the spin coating conditions and the viscosity of the sol-gel solution. By repeating the steps of application by spin coating and firing, a PZT dielectric layer was formed to a thickness of about 1 $\mu$m.

By repeating similar operation, thick-film dielectric layers of 10 $\mu$m thick and dielectric layers of 1 $\mu$m thick formed by the solution coating-and-firing technique were successively formed, yielding a laminate of a thick-film dielectric layer (5 $\mu$m)/a dielectric layer formed by the solution coating-and-firing technique (1 $\mu$m)/a thick-film dielectric layer (10 $\mu$m)/a dielectric layer formed by the solution coating-and-firing technique (1 $\mu$m). This laminate had a relative permittivity of about 2500.

A light emitting layer was formed by heating a Mn-doped ZnS evaporation source while keeping the substrate temperature at 200° C., effecting vacuum evaporation to deposit an emissive ZnS thin film of 0.8 $\mu$m thick, and heat treating it in vacuum at 600° C. for 10 minutes.

Next, a $Si_3N_4$ thin film of 0.1 $\mu$m thick as an insulator layer and an ITO thin film of 0.5 $\mu$m thick as an upper electrode layer were successively formed by sputtering, completing an EL device. During the process, a metal mask was used during deposition of the ITO thin film as the upper electrode layer whereby it was patterned in a plurality of stripes having a line width of 1 mm and a space of 0.5 mm.

For comparison purpose, samples were formed in which a thick-film dielectric layer of 30 $\mu$m thick and a dielectric layer of about 3 $\mu$m thick formed by the solution coating-and-firing technique were formed each one.

While electrodes were led out of the lower electrode and the upper transparent electrode in the resulting device structure, the device was operated at 25° C. by applying a voltage of 180 V at a frequency of 1 kHz and a pulse width of 50 $\mu$s. The relative luminance $L/L_0$ during continuous operation was measured wherein $L_0$ is the luminance at the start of voltage application. The inventive sample and Comparative Example 3 had been sealed in a $N_2$ atmosphere below the atmospheric pressure. Specifically, the space in the EL panel sealed with a sealing glass had a $N_2$ atmosphere below the atmospheric pressure. Similarly, Comparative Example 1 was sealed in a $N_2$ atmosphere at the atmospheric pressure. Comparative Example 2 was completed by placing a desiccant and a non-sealed EL panel in a glass tube larger than the sealing space, purging with $N_2$ gas, and evacuating to below the atmospheric pressure. The results are shown in FIG. 9.

Figure 9:
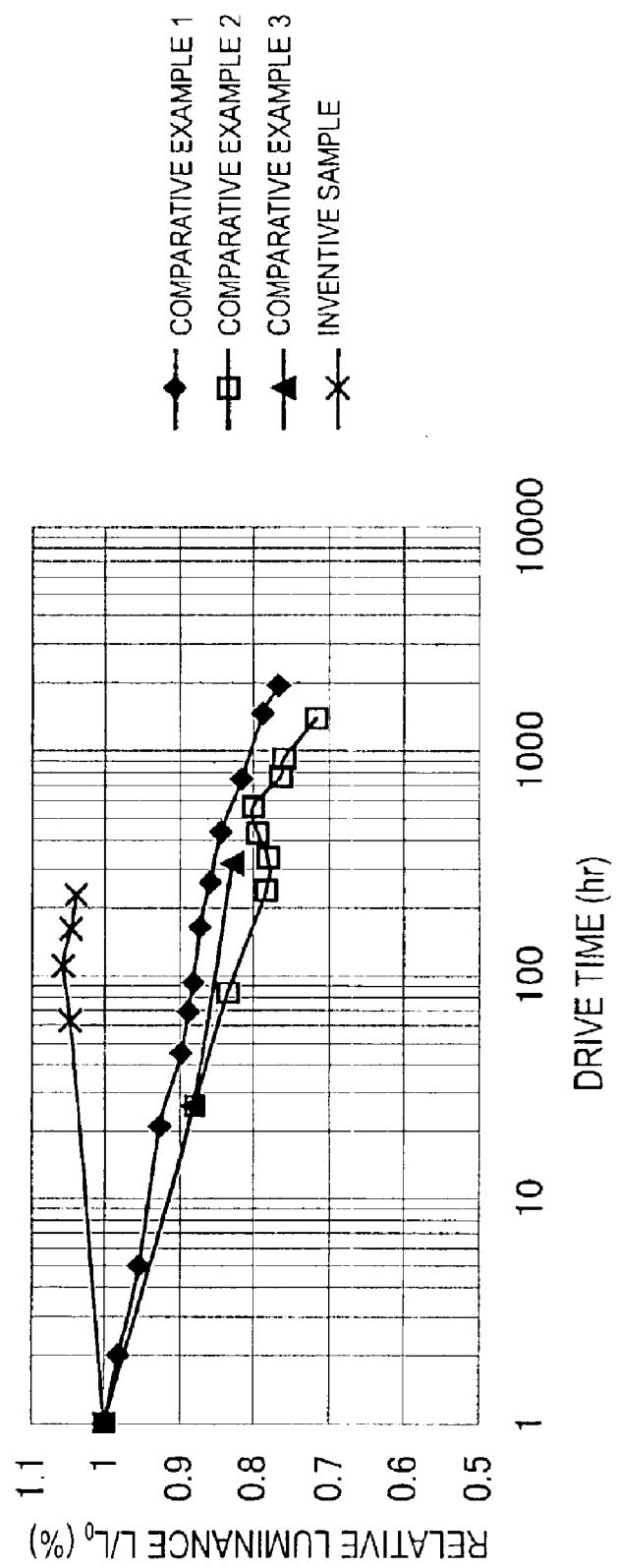
FIG. 9 is a graph showing a relative luminance $L/L_0$ versus drive time in Example A-1.

In FIG. 9, the operating time converted to a drive frequency of 75 Hz is on the abscissa (X axis) and the relative value of emission luminance is on the ordinate (Y axis). The value of 1 designated on the abscissa stands for the start of voltage application. As seen from the figure, the inventive sample is superior to Comparative Example 1 which is the best among the comparative samples, and experiences substantially no luminance decline.

Example A-2

To conduct a withstand voltage test on composite substrates according to the invention, samples of the construction: alumina substrate/lower Au electrode/composite thick-film dielectric layer (inventive structure)/upper ITO electrode were prepared.

The lower Au electrode and the upper ITO electrode had the same shape as in Example A-1 and included 80 lines and 70 lines, respectively.

The composite thick-film dielectric layer was formed by alternately stacking thick-film dielectric layers A and dielectric layers B arising from the solution coating-and-firing technique. The order of stacking is described from left to right.

V-1 sample: A (5 μm)/B (1 μm)/A (10 μm)/B (1 μm)
V-2 sample: B (0.3 μm)/A (5 μm)/B (0.1 μm)/A (10 μm)/B (1 μm)
V-3 sample: A (5 μm)/B (0.1 μm)/A (5 μm)/B (0.1 μm)/A (5 μm)/B (1 μm)

For comparison with the foregoing samples, a comparative sample V-4 of a conventional structure was prepared.

V-4 sample: A (20 μm)/B (1 μm)

The withstand voltage test was carried out using a withstand voltage testing instrument TOS5052 by Kikusui Electronic Industry Co., Ltd. The test included the steps of applying a voltage of sine wave at 60 Hz between all 80 lines of the lower Au electrode and one line of the upper ITO electrode, increasing the voltage stepwise at intervals of 10 V, and holding each voltage for 3 seconds. The breakdown voltage is the voltage at which a current flow of 1.0 mA is detected. The test was performed on 70 specimens for each. An average breakdown voltage and a minimum breakdown voltage are reported in Table 1.

TABLE 1

| Sample No. (number of A + B layers) | Total thickness of A + B layers (μm) | Average breakdown voltage (V) | Minimum breakdown voltage (V) | Number of entirely broken specimens until 200 V | Number of entirely broken specimens until 250 V |
|---|---|---|---|---|---|
| v-1 (4) | 17.0 | 334 | 270 | 0 | 0 |
| V-2 (5) | 16.4 | 342 | 290 | 0 | 0 |
| V-3 (6) | 16.2 | 345 | 300 | 0 | 0 |
| V-4 (2) | 21 | 315 | 170 | 2 | 3 |

As is evident from Table 1, the minimum breakdown voltage of V-1 sample increases 100 V from that of V-4 sample of the conventional structure. The number of entirely broken specimens until 250 V is 3 specimens for V-4 sample of the conventional structure, but is 0 for each of the inventive samples. These results demonstrate the superiority of the inventive structure.

A comparison of the total number of A+B layers reveals that both the average breakdown voltage and the minimum breakdown voltage increase, independent of the total thickness of A+B layers, as the number of layers increases. This suggests that the EL panel becomes more reliable as the number of layers increases.

Example B-1

On a 96% pure alumina substrate, screen printing followed by drying was repeated using a 22% gold resinate paste (RP2003/237 by Heraeus) so that a film thickness of 0.6 μm was reached at the end of firing. Thereafter, the coating was fired in a full air feed atmosphere at 850° C. for 20 minutes. The electrode layer thus obtained was patterned by a photo-etching technique into a plurality of stripes having a width of 250 μm and a space of 30 μm.

On the substrate having the lower electrode formed thereon, a buffer layer of tantalum oxide, barium titanate or alumina was formed by sputtering. The depositing conditions are shown below.

(1) Tantalum oxide ($Ta_2O_5$)
  target: $Ta_2O_5$
  sputtering gas: Ar 100 SCCM
  reactive gas: $O_2$ 15 SCCM
  pressure during deposition: 0.4 Pa (2) Barium titanate ($BaTiO_3$)
  target: $BaTiO_3$
  sputtering gas: Ar 60 SCCM
  pressure during deposition: 0.5 Pa (3) Alumina ($Al_2O_3$)
  target: $Al_2O_3$
  sputtering gas: Ar 100 SCCM
  pressure during deposition: 0.4 Pa The films thus deposited were analyzed for composition, finding $Ta_2O_5$ for the tantalum oxide film (1), $BaTiO_3$ for the barium titanate film (2) and $Al_2O_3$ for the alumina film (3). It is noted that the barium titanate film was annealed at 700° C. for 10 minutes after deposition.

Figure 10:
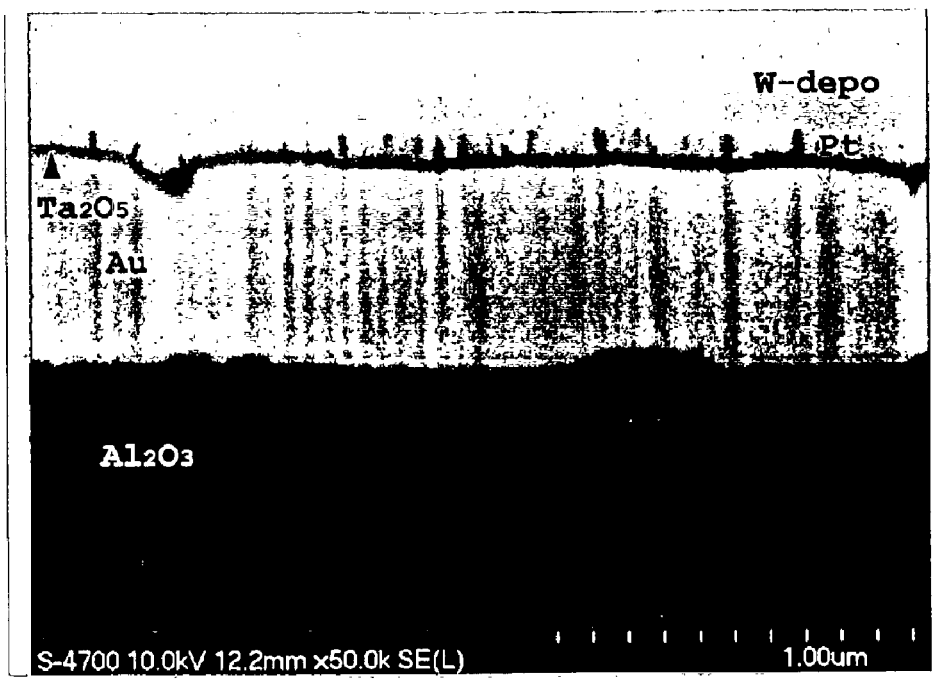
FIG. 10 is a photomicrograph in cross section of inventive sample B-1 following deposition of a buffer layer.

Of these samples, the sample having tantalum oxide deposited to 0.03 μm is designated sample B-1, the sample having barium titanate deposited to 0.03 μm is designated sample B-2, and the sample having tantalum oxide deposited to 0.1 μm is designated sample B-3. The sample having alumina deposited to 0.03 μm is designated comparative sample B-1. The sample without a buffer layer is designated comparative sample B-2. FIG. 10 is a photomicrograph showing a cross section of a portion of sample B-1 in this state.

Further, a dielectric ceramic thick film was formed by a screen printing technique. The thick film paste used was thick-film dielectric paste 4210C by ESL. Screen printing and drying steps were repeated such that a film thickness of 20 μm was obtained at the end of firing.

After the printing and drying steps, the thick film was fired in a belt furnace having a full air feed atmosphere at 850° C. for 20 minutes. The permittivity of the thick film was measured between the lower electrode and a test electrode formed on the thick film for measurement, finding a value of about 3600 which was in approximate agreement with the value of the bulk. This suggests that the influence of the buffer layer on permittivity is substantially negligible.

Figure 11:
FIG. 11 is a photomicrograph in cross section of inventive sample B-1 following deposition of a thick-film dielectric layer and firing.

This thick-film dielectric layer had a flat surface, on which few asperities of a size greater than the surface roughness attributable to the thick film material were ascertained. It is noted that steps corresponding to the pattern configuration of the lower electrode were somewhat ascertained by an observation from the surface, but to such an extent as not to interfere with the display function. Also, the substrate having the thick-film dielectric layer formed thereon was cut and its section was visually examined. No traces of the buffer layer were found. A visual observation confirmed that the buffer layer had been completely absorbed in and integrated with the thick-film layer. FIG. 11 is a photomicrograph of a portion of Sample B-1 in this state.

A dielectric layer was formed on the substrate by a solution coating-and-firing technique. In forming the dielectric layer by the solution coating-and-firing technique, a sol-gel solution of PZT (prepared by the following procedure) was furnished and used as a precursor solution in the solution coating-and-firing technique. The steps of applying the precursor solution to the thick-film dielectric layer by spin coating and firing the coating at 700° C. for 15 minutes were repeated predetermined times.

For preparing a fundamental sol-gel solution, 8.49 g of lead acetate trihydrate and 4.17 g of 1,3-propane diol were heated and stirred for about 2 hours to form a clear solution. Separately, 3.70 g of a 70 wt % 1-propanol solution of zirconium n-propoxide and 1.58 g of acetyl acetone were heated and stirred in a dry nitrogen atmosphere for 30 minutes, and 3.14 g of a 75 wt % 2-propanol solution of titanium diisopropoxide bisacetyl acetonate and 2.32 g of 1,3-propane diol were added to the solution, which was heated and stirred for 2 hours. These two solutions were mixed at 80° C., heated and stirred in a dry nitrogen atmosphere for 2 hours, obtaining a brown clear solution. The solution was held at 130° C. for several minutes to remove by-products, and heated and stirred for a further 3 hours, yielding a PZT precursor solution.

The PZT precursor solution was adjusted to an appropriate viscosity by diluting it with n-propanol. The thickness per layer of the dielectric layers was set at about 0.5 $\mu$m per layer by adjusting the spin coating conditions and the viscosity of the sol-gel solution. By repeating three times the steps of application by spin coating and firing, a PZT dielectric layer was formed to a thickness of about 1.5 $\mu$m.

Figure 12:
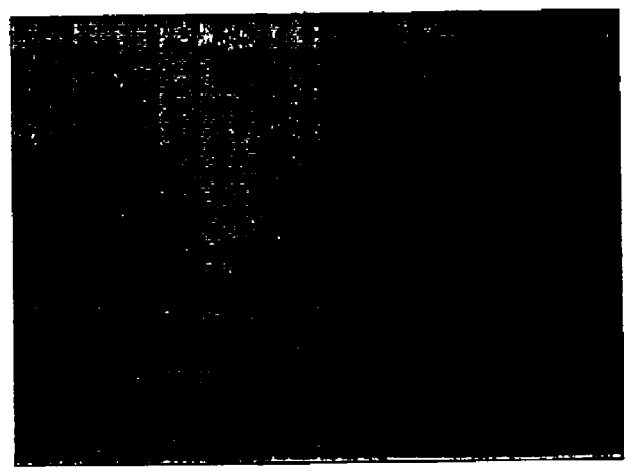
FIG. 12 is a photomicrograph taken on the surface of a PZT dielectric layer (smoothing layer)-bearing substrate of a comparative sample.

The surface state of the PZT layer was visually examined, but the occurrence of cracks or defects was not found. In comparative sample B-2 without forming the buffer layer, cracks occurred on some areas of the surface as shown in FIG. 12.

A light emitting layer was formed by heating a Mn-doped ZnS evaporation source while keeping the substrate temperature at 200° C., effecting vacuum evaporation to deposit an emissive ZnS thin film of 0.8 $\mu$m thick, and heat treating it in vacuum at 600° C. for 10 minutes.

Next, a $Si_3N_4$ thin film as an insulator layer and an ITO thin film as an upper electrode layer were successively formed by sputtering, completing an EL device. Using a lift-off technique in the latter step, the ITO thin film as the upper electrode layer was patterned in a plurality of stripes having a line width of 250 $\mu$m and a space of 30 $\mu$m.

The resulting device was examined whether or not it produced abnormal light emissions such as bright spots during operation. Samples in a relatively good state were selected from inventive samples B-1, B-2 and B-3, comparative sample B-1 using alumina, and comparative sample B-2 without forming the buffer layer, and their emission characteristics (L-V characteristics) were examined. The emission characteristics were examined by leading electrodes out of the lower electrode and the upper transparent electrode in the device structure, and applying an electric field at a frequency of 75 Hz and a pulse width of 100 $\mu$s until the luminance of light emission was saturated.

Figure 13:
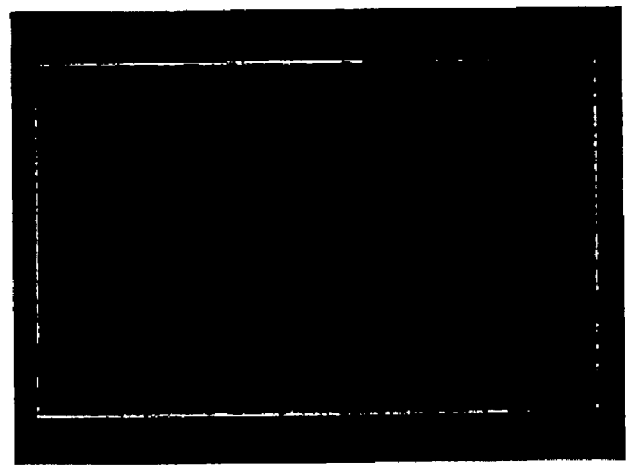
FIG. 13 is a photograph showing an inventive sample in a light emitting state.
Figure 14:
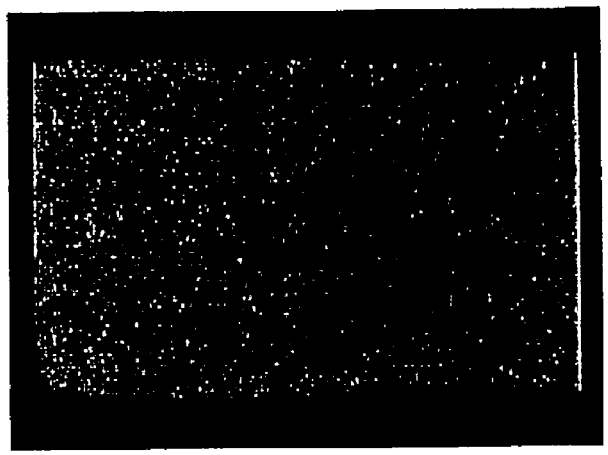
FIG. 14 is a photograph showing a comparative sample in a light emitting state.
Figure 15:
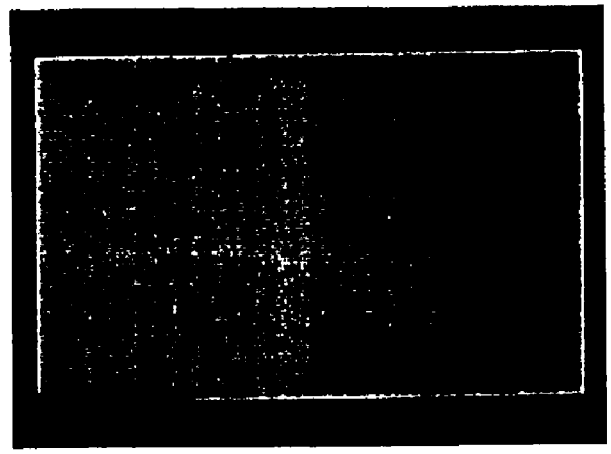
FIG. 15 is a photograph showing a comparative sample in a light emitting state.

FIG. 13 shows the inventive sample in the state of light emission at 100 cd/m$^2$, and FIGS. 14 and 15 show the comparative sample in the states of light emission at 100 cd/m$^2$ and 600 cd/m$^2$. It is seen from these figures that the comparative sample produced unevenness of light emission, especially a number of bright spots at low luminance light emission, whereas the inventive sample produced uniform light emission.

Figure 16:
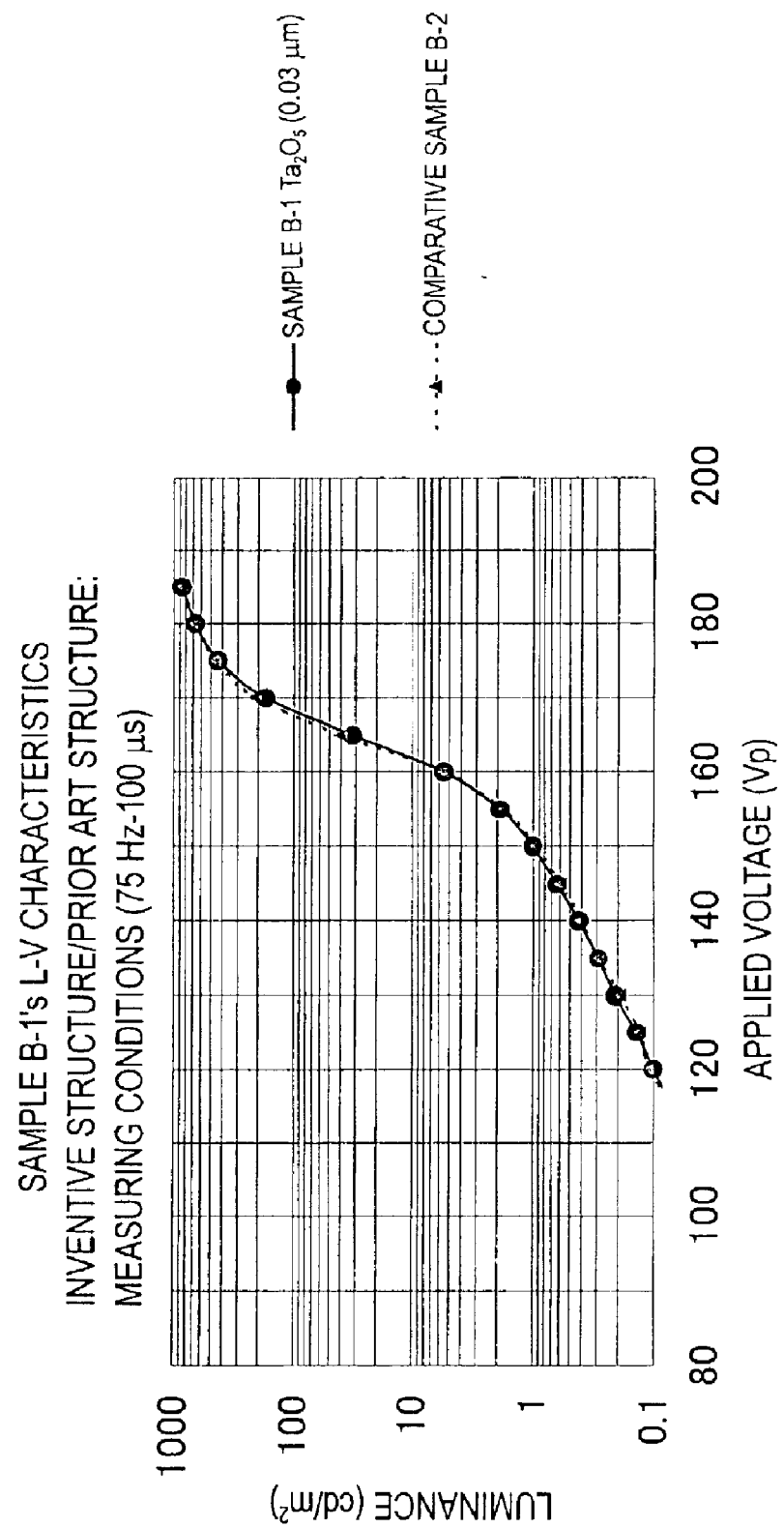
FIG. 16 is a graph showing L-V characteristics of comparative sample B-2 and inventive sample B-1.
Figure 17:
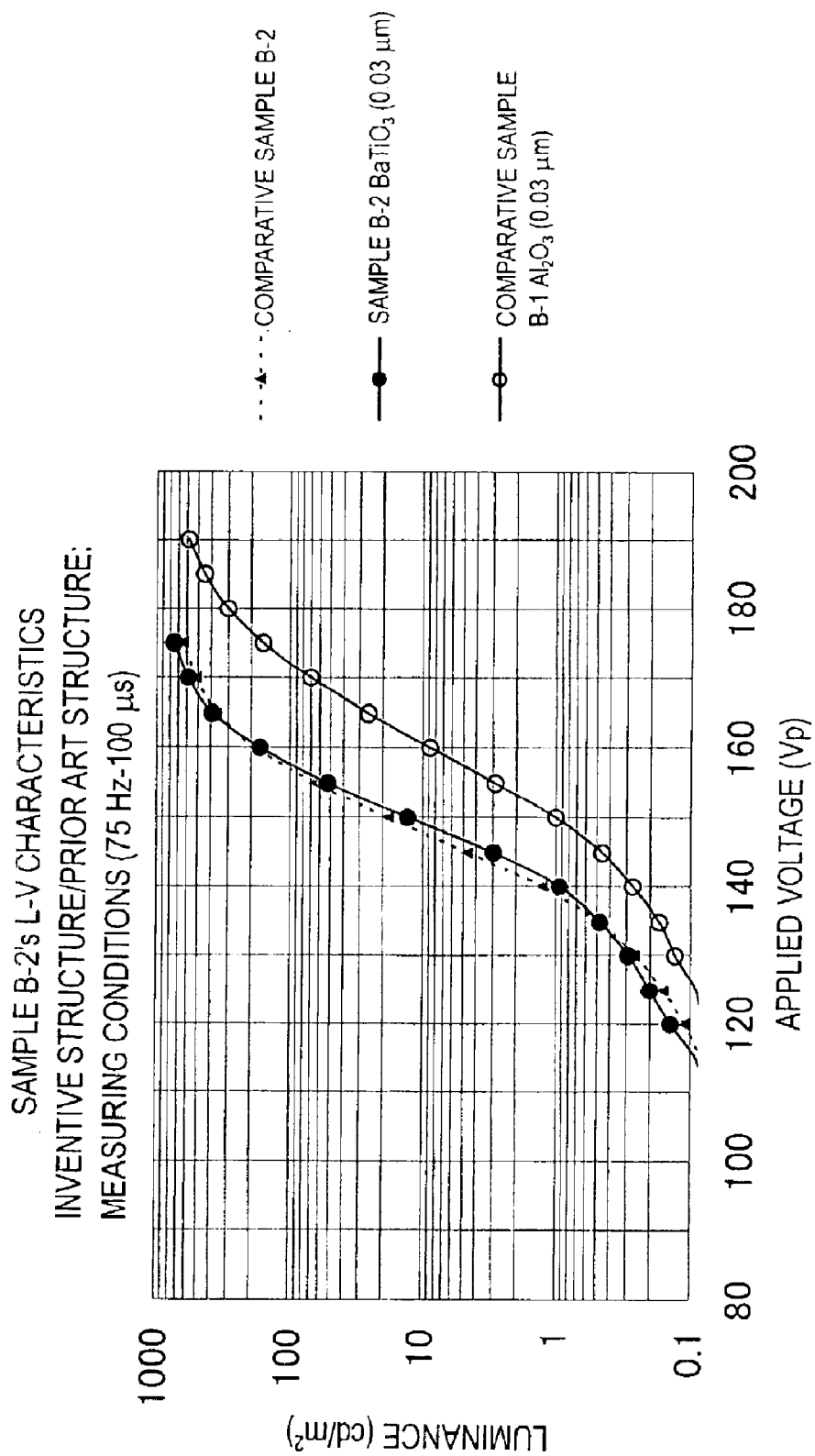
FIG. 17 is a graph showing L-V characteristics of comparative samples B-1 and B-2 and inventive sample B-2.
Figure 18:
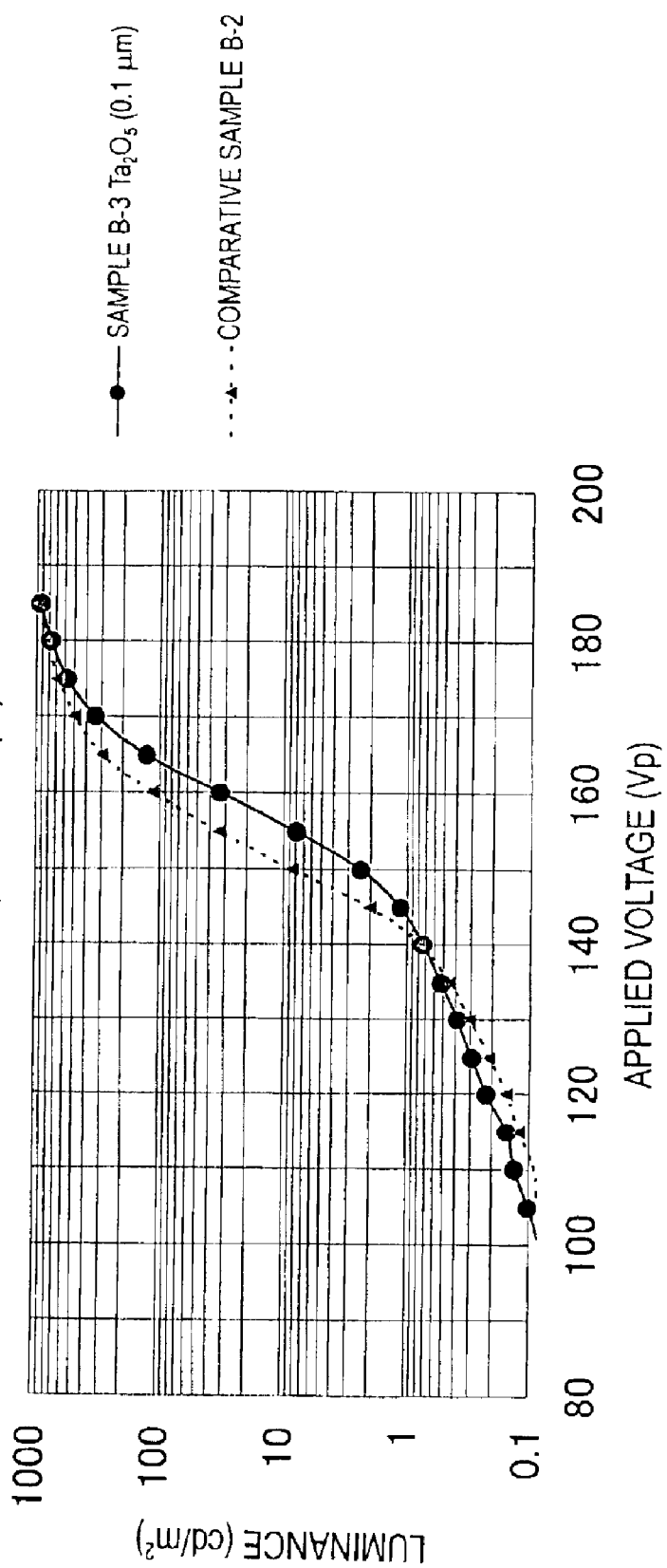
FIG. 18 is a graph showing L-V characteristics of comparative sample B-2 and inventive sample B-3.
Figure 19:
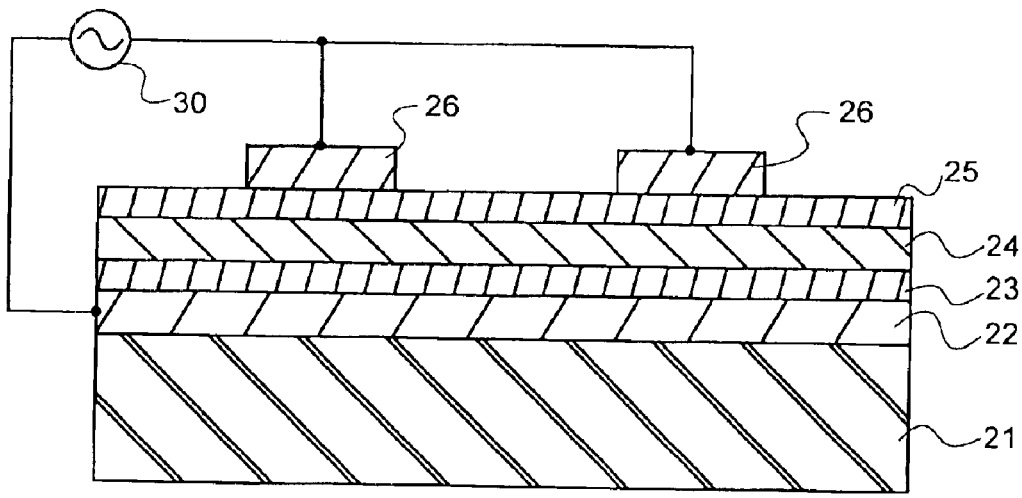
FIG. 19 is a schematic sectional view showing the construction of a prior art EL device.
Figure 20:
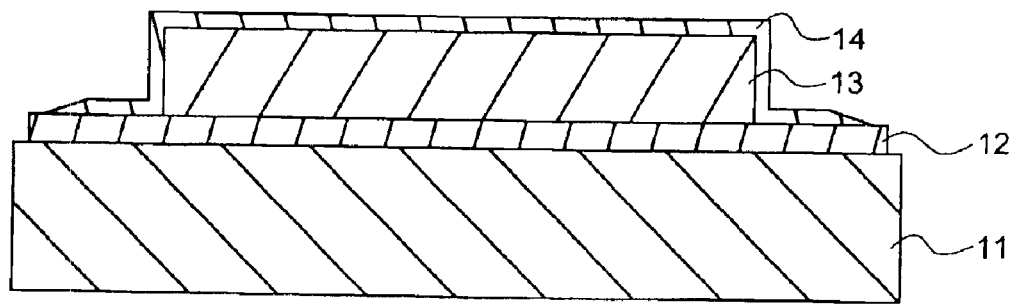
FIG. 20 is a schematic sectional view showing the construction of another prior art EL device.

FIG. 16 shows the L-V characteristics of inventive sample B-1 and comparative sample B-2. FIG. 17 shows the L-V characteristics of inventive sample B-2 and comparative samples B-1 and B-2. FIG. 18 shows the L-V characteristics of inventive sample B-3 and comparative sample B-2. It is seen from these L-V characteristic graphs that the provision of the buffer layer causes no degradation of electrical characteristics and exhibits equivalent emissive characteristics to the prior art. The sample using alumina which does not form a solid solution with the thick-film ceramic layer shows an increase of drive voltage because of an influence of the buffer layer which is not integrated with the thick-film layer.

BENEFITS OF THE INVENTION

The composite substrate of the invention keeps the thick-film dielectric layer fully insulating and enables the functional thin films formed thereon, typically light emitting layer to perform stable operation, especially stable light emission. An EL panel using the same and a method for preparing the same are also provided.

According to the inventive method, an EL device, in which a thick-film ceramic dielectric layer is endowed with surface smoothness by a sol-gel dielectric layer, is prepared in a consistent manner such that the EL device may produce EL light emission without variation during operation. The EL device prepared thereby is also provided.

What is claimed is:

1. A method for manufacturing an EL device comprising an electrically insulating substrate, a patterned first electrode layer formed above the substrate, a dielectric layer covering at least a part of the first electrode layer, a light emitting layer and a second electrode layer successively formed above the dielectric layer, said dielectric layer having a multilayer structure including a first dielectric layer in the form of a thick film and a second dielectric layer formed by a solution coating-and-firing technique, said method comprising the steps of forming one or more first dielectric layers;

forming a buffer layer below the one first dielectric layer or forming buffer layers between the more than one first dielectric layers, wherein the buffer layer is formed by sputtering or evaporation when the buffer layer is formed below the one first dielectric layer, and wherein the buffer layers are formed by a solution coating-and-firing technique when the buffer layers are formed between the more than one first dielectric layers, and wherein said one or more first dielectric layer is formed by firing a powder insulating material according to a think-film technique.

2. The method of claim 1, wherein said solution coating-and-firing technique includes a step of applying a solution by spin coating, dip coating or spray coating, and wherein said think-film technique includes screen printing or green sheet placement.

3. The method of claim 1, wherein said buffer layer includes at least one of a complex perovskite relaxation ferroelectric material, a bismuth layer compound, $PbNb_2O_3$, a tantalum oxide, a titanium oxide, an yttrium oxide, a niobium oxide and a zinzonium oxide.

4. The method of claim 3, wherein said complex perovskite relaxation ferroelectric material includes $Pb(Mg_{1/3}Nb_{2/3}O_3)$, and said bismuth layer compound includes $Bi_4Ti_3O_{12}$ or $SrBi_2Ta_2O_9$.

5. The method of claim 1, wherein said buffer layer includes at least one of a tantalum oxide, a titanium oxide, an yttrium oxide, a niobium oxide and a zirconium oxide.

* * * * *